US011686873B2

(12) United States Patent
Kan et al.

(10) Patent No.: US 11,686,873 B2
(45) Date of Patent: Jun. 27, 2023

(54) SUBMERGED BUOY DATA ACQUISITION SYSTEM

(71) Applicants: The First Institute of Oceanography, SOA, Qingdao (CN); Xi'an Hong Lu Yang Electrical Equipment Co., Ltd., Xi'an (CN)

(72) Inventors: Guangming Kan, Qingdao (CN); Zili Chen, Qingdao (CN); Baohua Liu, Qingdao (CN); Yanliang Pei, Qingdao (CN); Yanhong Lian, Qingdao (CN)

(73) Assignees: The First Institute of Oceanography, SOA, Qingdao (CN); Xi'an Hong Lu Yang Electrical Equipment Co., Ltd., Xi'an (CN)

( * ) Notice: Subject to any disclaimer, the term of this patent is extended or adjusted under 35 U.S.C. 154(b) by 478 days.

(21) Appl. No.: 16/301,454

(22) PCT Filed: May 31, 2018

(86) PCT No.: PCT/CN2018/089108
§ 371 (c)(1),
(2) Date: Nov. 14, 2018

(87) PCT Pub. No.: WO2019/001210
PCT Pub. Date: Jan. 3, 2019

(65) Prior Publication Data
US 2020/0386545 A1      Dec. 10, 2020

(30) Foreign Application Priority Data

Jun. 27, 2017   (CN) .......................... 201710500438.X

(51) Int. Cl.
*G01V 1/38* (2006.01)
*G01S 19/14* (2010.01)
(Continued)

(52) U.S. Cl.
CPC ................ *G01V 1/38* (2013.01); *G01S 19/14* (2013.01); *G01V 1/164* (2013.01); *G01V 1/186* (2013.01)

(58) Field of Classification Search
CPC ....................................................... G01S 19/14
See application file for complete search history.

(56) References Cited

U.S. PATENT DOCUMENTS 8,352,184 B2    1/2013  Meyer
8,704,485 B1 *  4/2014  Tsukamoto ......... H01M 10/625
                                                    320/112

(Continued)

FOREIGN PATENT DOCUMENTS

CN      203490490 U     3/2014
CN      105350956 A     2/2016
(Continued)

OTHER PUBLICATIONS

Tadiran 2008, "Model TL-5930" (Year: 2008).*

*Primary Examiner* — Isam A Alsomiri
*Assistant Examiner* — Joseph C Fritchman
(74) *Attorney, Agent, or Firm* — IP Attorneys Group, LLC; David Chen; Jared Vitola

(57) ABSTRACT

The present invention discloses a new submerged buoy data acquisition system, including a battery compartment, a main control processor, a GPS receiver, a gigabit Ethernet interface module, and a plurality of data acquisition boards, where the GPS receiver is connected to the main control processor, and the main control processor is connected to a host computer by using the gigabit Ethernet interface module; the data acquisition board includes a hydrophone sensor, a front-end drive circuit, an AD conversion circuit, a clock module, a DA conversion circuit, an FPGA, an ARM processor, and a storage module; the hydrophone sensor is connected to the AD conversion circuit by using the front- (Continued)

end drive circuit, the AD conversion circuit is connected to the FPGA, the FPGA is connected to the ARM processor, the storage module is connected to the ARM processor, the DA conversion circuit is connected to the FPGA and the clock module, the clock module is connected to the FPGA, and the ARM processor is connected to the main control processor. The present invention improves acquisition performance of the submerged buoy data acquisition system, and implements synchronous acquisition and control of the entire system.

8 Claims, 2 Drawing Sheets

(51) Int. Cl.
*G01V 1/18* (2006.01)
*G01V 1/16* (2006.01)

(56) References Cited

U.S. PATENT DOCUMENTS

| | | | |
|---|---|---|---|
| 2004/0172207 A1 | 9/2004 | Handcock et al. | |
| 2009/0184772 A1* | 7/2009 | Lee | H03L 1/00 331/44 |
| 2013/0328504 A1* | 12/2013 | Yavor | H05B 45/3725 315/307 |
| 2014/0219051 A1* | 8/2014 | Pavel | G01V 1/162 367/14 |
| 2016/0116563 A1* | 4/2016 | Kieffer | G01S 1/725 367/134 |
| 2016/0241280 A1* | 8/2016 | Van der Goes | H04B 15/04 |

FOREIGN PATENT DOCUMENTS

| | | | |
|---|---|---|---|
| CN | 105509805 A | * | 4/2016 |
| CN | 105509805 A | | 4/2016 |
| CN | 107449405 A | | 12/2017 |

* cited by examiner

SUBMERGED BUOY DATA ACQUISITION SYSTEM

This application is a National Stage entry of International Application No. PCT/CN2018/089108, filed May 31, 2018, which claims priority to Chinese Patent Application No. 201710500438.X, filed with the Chinese Patent Office on Jun. 27, 2017 and entitled "NEW SUBMERGED BUOY DATA ACQUISITION SYSTEM", which is incorporated herein by reference in its entirety.

TECHNICAL FIELD

The present invention relates to the field of data acquisition technologies, and in particular, to a new submerged buoy data acquisition system.

BACKGROUND

A submerged buoy technology started to be used and developed in the sixties by some developed maritime countries. A submerged buoy system is important technical equipment for marine environmental investigation, can continuously, synchronously, and automatically implement comprehensive long-term monitoring on factors such as marine hydrology and meteorology in a severe marine environmental condition without an attended operation, and is extension of a marine observation shore station, a research vessel, and a research aircraft in space and time and is an important means of offshore monitoring. In an existing submerged buoy system, multiple hydrophones are usually connected in series/parallel to increase energy of a received analog signal, where a hydrophone includes a hydrophone sensor, and the hydrophone sensor is configured to receive a sound signal in an ocean, amplify the received analog sound signal by using a front end circuit, and transmit the amplified analog sound signal to a host computer by using a towing rope with a length of several meters or even hundreds of meters, and the host computer performs analog-digital conversion and further processing on the analog sound signal. In this way, a long-distance towing rope causes attenuation and interference on the analog sound signal. As a result, acquisition performance of the submerged buoy system is reduced.

SUMMARY

In view of this, this present invention provides a new submerged buoy data acquisition system, so as to reduce attenuation and interference on received data, improve acquisition performance of a submerged buoy data acquisition system, and implement synchronous acquisition and control of the entire submerged buoy data acquisition system.

To resolve the above problem, the present invention provides the following technical solution:

A new submerged buoy data acquisition system is provided, including a battery compartment, a main control processor, a GPS receiver, a gigabit Ethernet interface module, and at least one data acquisition board, where the battery compartment is configured to supply power for each electric module, the GPS receiver is connected to an input end of the main control processor, an input end of the gigabit Ethernet interface module is connected to the input end of the main control processor, and an output end of the gigabit Ethernet interface module is connected to a host computer by using a bus;

the data acquisition board includes a hydrophone sensor, a front-end drive circuit, an AD conversion circuit, a clock module, a DA conversion circuit, an FPGA, an ARM processor, and a storage module, where an output end of the hydrophone sensor is connected to an input end of the AD conversion circuit by using the front-end drive circuit, an output end of the AD conversion circuit is connected to an input end of the FPGA, the FPGA is connected to the ARM processor, the storage module is connected to an output end of the ARM processor, an input end of the DA conversion circuit is connected to an output end of the FPGA, an output end of the DA conversion circuit is connected to an input end of the clock module, an output end of the clock module is connected to the input end of the FPGA, and the ARM processor is connected to the main control processor.

Further, the main control processor includes a chip XC7Z020-2CLG400I.

Further, the GPS receiver includes a Lassen LP GPS time receiver.

Further, the gigabit Ethernet interface module includes a chip 88E1340S.

Further, the ARM processor uses an ARM chip of a STM32F207 series.

Further, a model number of the hydrophone sensor is TL-30DS.

Further, the AD conversion circuit includes an analog-digital converter whose model number is ADS1263IPW.

Further, the clock module includes a constant temperature crystal oscillator OCXO, and the DA conversion circuit includes a digital-analog converter whose model number is AD5331.

Further, the storage module includes an SDIO interface circuit and an SD card, and the ARM processor is connected to the SD card by using the SDIO interface circuit.

Further, the battery compartment includes eight battery packs, and each battery pack includes double ER34615M battery cells.

The new submerged buoy data acquisition system of the present invention has the following beneficial effects:

The present invention provides a new submerged buoy data acquisition system, including a battery compartment, a main control processor, a GPS receiver, a gigabit Ethernet interface module, and at least one data acquisition board. The battery compartment is configured to supply power for each electric module. Each data acquisition board is connected to the main control processor. A hydrophone sensor of each data acquisition board is configured to detect a sound wave signal in real time, and then amplify the detected analog sound wave signal by using a front-end driver circuit and input the amplified analog sound wave signal to an AD conversion circuit. The AD conversion circuit converts the amplified analog sound wave signal into a digital sound wave signal and inputs the digital sound wave signal to an FPGA. The FPGA transmits the digital sound wave signal to an ARM processor. The ARM processor stores the digital sound wave signal in a storage module. In this way, an acquisition process of each data acquisition board is completed. In addition, the ARM processor of each data acquisition board may further send the received digital sound wave signal to the main control processor, and the main control processor transmits the received digital sound wave signal to a host computer by using the gigabit Ethernet interface module, so that the host computer monitors each data acquisition board according to the received digital sound wave signal, so as to ensure that each data acquisition board works properly. Therefore, it can be learned that, in the present invention, the received analog sound wave signal is converted into a digital sound wave signal and the digital sound wave signal is stored in an SD card nearby, so as to avoid a loss of received data. The received digital data is further transmitted to the host computer by using the gigabit Ethernet interface module, so as to reduce attenuation and interference on the received data, and improve acquisition performance of the submerged buoy data acquisition system. In addition, the GPS receiver is configured to provide high-precision timing information, and send the timing information to the main control processor, and ultimately the main control processor sends the timing information to the FPGA of each data acquisition board. The FPGA of each data acquisition board sets an output voltage of a DA conversion circuit according to a clock module and the received timing information, so as to adjust an oscillation frequency of the clock module. In this way, a purpose of clock calibration is achieved, synchronous trigger input and synchronous trigger output of each data acquisition board are implemented; in other words, synchronous acquisition and control of the entire submerged buoy data acquisition system are implemented.

BRIEF DESCRIPTION OF DRAWINGS

In order to describe the technical solutions in the embodiments of the present invention or in the prior art more clearly, the following briefly describes the accompanying drawings required in the embodiments. Apparently, the accompanying drawings in the following description show some embodiments of the present invention, and a person just with ordinary skill in the art may still derive other drawings from these accompanying drawings without any creative effort.

DETAILED DESCRIPTION OF EMBODIMENTS

The following clearly and completely describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

In order to make the objectives, features, and advantages of the present invention more obvious and easy to understand, the following further describes the present invention in details with reference to the accompanying drawings and specific implementations.

Figure 1:
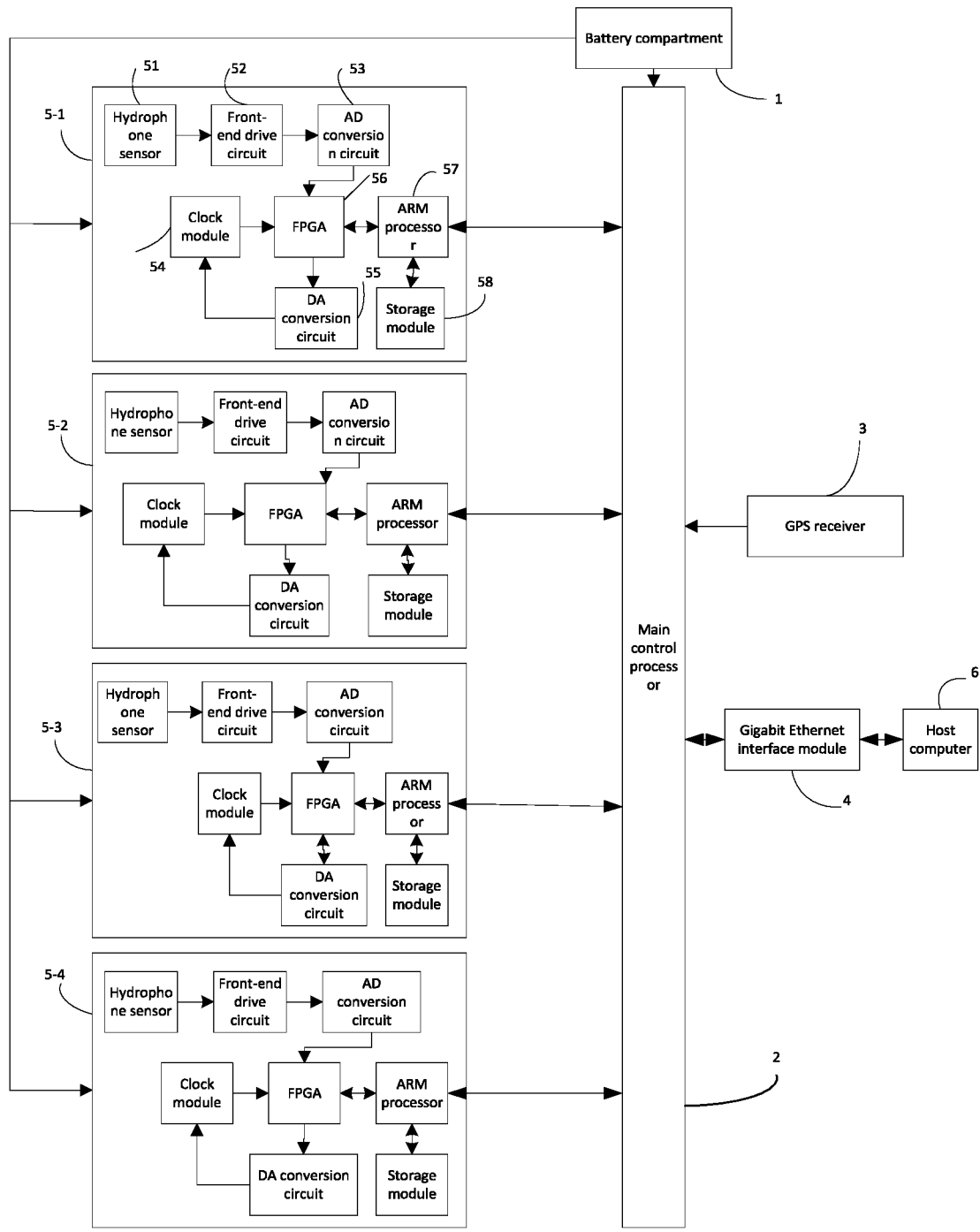
FIG. 1 is a block diagram of a circuit principle of a new submerged buoy data acquisition system according to the present invention.

As shown in FIG. 1, a new submerged buoy data acquisition system in an embodiment includes a battery compartment 1, a main control processor 2, a GPS receiver 3, a gigabit Ethernet interface module 4, and at least one data acquisition board, where the battery compartment 1 is configured to supply power for each electric module, the GPS receiver 3 is connected to an input end of the main control processor 2, an input end of the gigabit Ethernet interface module 4 is connected to the input end of the main control processor 2, and an output end of the gigabit Ethernet interface module 4 is connected to a host computer 6 by using a bus.

The data acquisition board includes a hydrophone sensor 51, a front-end drive circuit 52, an AD conversion circuit 53, a clock module 54, a DA conversion circuit 55, an FPGA 56, an ARM processor 57, and a storage module 58, where an output end of the hydrophone sensor 51 is connected to an input end of the AD conversion circuit 53 by using the front-end drive circuit 52, an output end of the AD conversion circuit 53 is connected to an input end of the FPGA 56, the FPGA 56 is connected to the ARM processor 57, the storage module 58 is connected to an output end of the ARM processor 57, an input end of the DA conversion circuit 55 is connected to an output end of the FPGA 56, an output end of the DA conversion circuit 55 is connected to an input end of the clock module 54, an output end of the clock module 54 is connected to the input end of the FPGA 56, and the ARM processor 57 is connected to the main control processor 2.

It should be noted that, preferably, there are four data acquisition boards. As shown in FIG. 1, the four data acquisition boards are a first data acquisition board 5-1, a second data acquisition board 5-2, a third data acquisition board 5-3, and a fourth data acquisition board 5-4, respectively. In addition, an ARM processor 57 of each data acquisition board is connected to the main control processor 2. In FIG. 1, only a reference number of each module inside the first data acquisition board 5-1 is given.

In this embodiment, the main control processor 2 includes a chip XC7Z020-2CLG400I.

In this embodiment, the GPS receiver 3 includes a Lassen LP GPS time receiver.

In this embodiment, the gigabit Ethernet interface module 4 includes a chip 88E1340S.

In this embodiment, the ARM processor 57 uses an ARM chip of a STM32F207 series.

In this embodiment, a model number of the hydrophone sensor 51 is TL-30DS.

Figure 2:
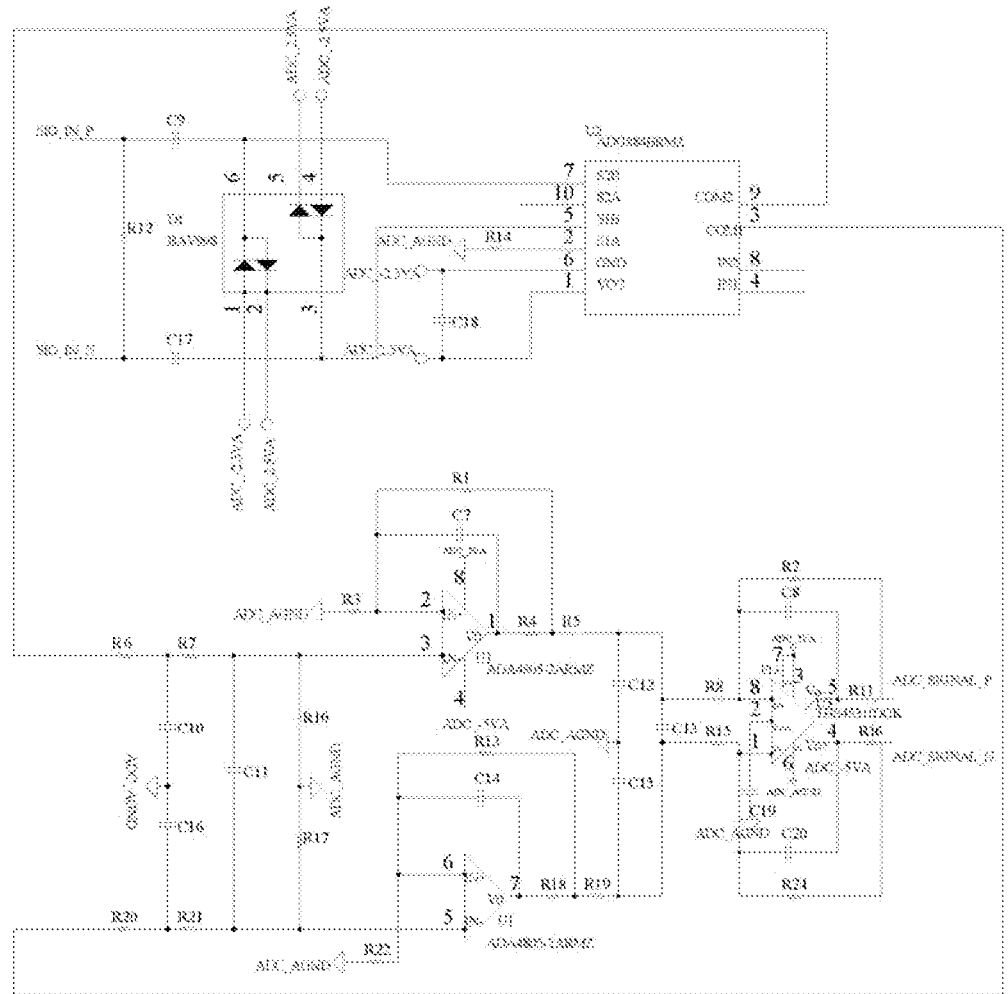
FIG. 2 is a circuit diagram of a front-end drive circuit according to the present invention.

It should be noted that, a specific circuit of the front-end drive circuit is not limited in the present invention, and may be a corresponding drive circuit in the prior art. For example, as shown in FIG. 2, the front-end drive circuit 52 includes an analog switch U2 whose model number is ADG884BRMZ, an operational amplifier U1 whose model number is ADA4805-2ARMZ, and a differential amplifier U3 whose model number is THS4531IDGK. A fifth pin and a seventh pin of U2 are connected to a data signal output end of TL-30DS. A third pin of U2 is connected to a fifth pin of U1 by using a resistor R20 and a resistor R21 that are connected in series, a ninth pin of U2 is connected to a third pin of U1 by using a resistor R6 and a resistor R7 that are connected in series, a second pin of U1 is grounded by using a resistor R3. A sixth pin of U1 is grounded by using a resistor R22. A first pin of U1 is connected to an eighth pin of U3 by using a resistor R4, a resistor R5, and a resistor R8 that are connected in series. A seventh pin of U1 is connected to a first pin of U3 by using a resistor R18, a resistor R19, and a resistor R15 that are connected in series. A fourth pin of U3 is connected to the AD conversion circuit by using a resistor R16. A fifth pin of U3 is connected to the AD conversion circuit by using a resistor R11.

A network label ADC_SIGAL_P and a network label ADC_SIGAL_N represent two ports connected to the AD conversion circuit, a network label GIG_IN_P and a network label GIG_IN_N represent two ports connected to the hydrophone sensor TL-30DS.

In this embodiment, the AD conversion circuit 53 includes an analog-digital converter whose model number is ADS1263IPW.

In this embodiment, the clock module 54 includes a constant temperature crystal oscillator OCXO, and the DA conversion circuit 55 includes a digital-analog converter whose model number is AD5331.

In this embodiment, the storage module 58 includes an SDIO interface circuit and an SD card, and the ARM processor 57 is connected to the SD card by using the SDIO interface circuit.

Specifically, a specific circuit connection between the SDIO interface circuit and the ARM processor 57 and the SD card is an existing technology, and details are not repeated herein.

In this embodiment, the battery compartment 1 includes eight battery packs, and each battery pack includes double ER34615M battery cells.

It should be noted that, the battery compartment 1 further includes a battery charge-discharge management module, a microcontroller, and a display. An input end of the battery charge-discharge management module is connected to a battery pack. An output end of the battery charge-discharge management module is connected to an input end of the microcontroller. The display is connected to an output end of the microcontroller. The battery charge-discharge management module is configured to detect a voltage and a current of the battery pack in real time, send the detected voltage and the detected current to the microcontroller, and then the microcontroller displays the received voltage and current of the battery pack by using the display.

The present invention provides a new submerged buoy data acquisition system, including a battery compartment 1, a main control processor 2, a GPS receiver 3, a gigabit Ethernet interface module 4, and at least one data acquisition board. The battery compartment 1 is configured to supply power for each electric module. Each data acquisition board is connected to the main control processor 2. A hydrophone sensor 51 of each data acquisition board is configured to detect a sound wave signal in real time, and then amplify the detected analog sound wave signal by using a front-end driver circuit 52 and input the amplified analog sound wave signal to an AD conversion circuit 53. The AD conversion circuit 53 converts the amplified analog sound wave signal into a digital sound wave signal and inputs the digital sound wave signal to an FPGA 56. The FPGA 56 transmits the digital sound wave signal to an ARM processor 57. The ARM processor 57 stores the digital sound wave signal in a storage module 58. In this way, an acquisition process of each data acquisition board is completed. In addition, the ARM processor 57 of each data acquisition board may further send the received digital sound wave signal to the main control processor 2, and the main control processor 2 transmits the received digital sound wave signal to a host computer 6 by using the gigabit Ethernet interface module 4, so that the host computer 6 monitors each data acquisition board according to the received digital sound wave signal, so as to ensure that each data acquisition board works properly. Therefore, it can be learned that, in the present invention, the received analog sound wave signal is converted into a digital sound wave signal and the digital sound wave signal is stored in an SD card nearby, so as to avoid a loss of received data. The received digital data is further transmitted to the host computer 6 by using the gigabit Ethernet interface module 4, so as to reduce attenuation and interference on the received data, and improve acquisition performance of the submerged buoy data acquisition system. In addition, the GPS receiver 3 is configured to provide high-precision timing information, send the timing information to the main control processor 2, and ultimately the main control processor 2 sends the timing information to the FPGA 56 of each data acquisition board. The FPGA 56 of each data acquisition board sets an output voltage of a DA conversion circuit 55 according to a clock module 54 and the received timing information, so as to adjust an oscillation frequency of the clock module. In this way, a purpose of clock calibration is achieved, synchronous trigger input and synchronous trigger output of each data acquisition board are implemented; in other words, synchronous acquisition and control of the entire submerged buoy data acquisition system are implemented.

The above description is only used to help understand the method and the core idea of the present invention. It should be noted that several improvements and modifications can be made to the present invention by a person of ordinary skill in the art without departing from the principle of the present invention, and the improvements and modifications also fall within the protection scope of the claims of the present invention. The various modifications made to these embodiments are obvious to a person skilled in the art, and the general principle defined in this specification may be implemented in other embodiments without departing from the spirit or scope of the present invention. Therefore, the present invention is not be restricted to the embodiments shown in this specification, but shall conform to the widest scope consistent with the principle and novel features disclosed in this specification.

What is claimed is:

1. A submerged buoy data acquisition system, comprising a battery compartment, a main control processor, a GPS receiver, a gigabit Ethernet interface module, and at least one data acquisition board, wherein the battery compartment is configured to supply power for each electric module, the GPS receiver is connected to an input end of the main control processor, an input end of the gigabit Ethernet interface module is connected to the input end of the main control processor, and an output end of the gigabit Ethernet interface module is connected to a host computer by using a bus;

the data acquisition board comprises a hydrophone sensor, a front-end drive circuit, an AD conversion circuit, a clock module, a DA conversion circuit, an FPGA, an ARM processor, and a storage module, wherein an output end of the hydrophone sensor is connected to an input end of the AD conversion circuit by using the front-end drive circuit, an output end of the AD conversion circuit is connected to an input end of the FPGA, the FPGA is connected to the ARM processor, the storage module is connected to an output end of the ARM processor, an input end of the DA conversion circuit is connected to an output end of the FPGA, an output end of the DA conversion circuit is connected to an input end of the clock module, an output end of the clock module is connected to the input end of the FPGA, and the ARM processor is connected to the main control processor, the GPS receiver is located on a water's surface;

the front-end drive circuit comprise an analog switch (U2), an operational amplifier (U1) and a differential amplifier (U3); a fifth pin and a seventh pin of the analog switch (U2) are connected to a data signal output end of the hydrophone sensor; a third pin of the analog switch (U2) is connected to a fifth pin of the operational amplifier (U1) by using a resistor (R20) and a resistor (R21) that are connected in series, a ninth pin of the analog switch (U2) is connected to a third pin of the operational amplifier (U1) by using a resistor (R6)

and a resistor (R7) that are connected in series, a second pin of the operational amplifier (U1) is grounded by using a resistor (R3); a sixth phi of the operational amplifier (U1) is grounded by using a resistor (R22); a first pin of the operational amplifier (U1) is connected to an eighth pin of the differential amplifier (U3) by using a resistor (R4), a resistor (R5), and a resistor (R8) that are connected in series; a seventh pin of the operational amplifier (U1) is connected to a first pin of the differential amplifier (U3) by using a resistor (R18), a resistor (R19), and a resistor (R15) that are connected in series; a fourth pin of the differential amplifier (U3) is connected to the AD conversion circuit by using a resistor (R16); a fifth pin of the differential amplifier (U3) is connected to the AD conversion circuit by using a resistor (R11).

2. The submerged buoy data acquisition system according to claim 1, wherein the AD conversion circuit comprises an analog-digital converter.

3. The submerged buoy data acquisition system according to claim 2, wherein the clock module comprises a constant temperature crystal oscillator OCXO, and the DA conversion circuit comprises a digital-analog converter.

4. The submerged buoy data acquisition system according to claim 3, wherein the storage module comprises an SDIO interface circuit and an SD card, and the ARM processor is connected to the SD card by using the SDIO interface circuit.

5. The submerged buoy data acquisition system according to claim 1, wherein the battery compartment comprises eight battery packs, and each battery pack comprises double lithium thionyl chloride battery cells with a nominal voltage of 3.6V, a nominal capacity of 19 Ah.

6. The submerged buoy data acquisition system according to claim 2, wherein the battery compartment comprises eight battery packs, and each battery pack comprises double lithium thionyl chloride battery cells with a nominal voltage of 3.6V, a nominal capacity of 19 Ah.

7. The submerged buoy data acquisition system according to claim 3, wherein the battery compartment comprises eight battery packs, and each battery pack comprises double lithium thionyl chloride battery cells with a nominal voltage of 3.6V, a nominal capacity of 19 Ah.

8. The submerged buoy data acquisition system according to claim 4, wherein the battery compartment comprises eight battery packs, and each battery pack comprises double lithium thionyl chloride battery cells with a nominal voltage of 3.6V, a nominal capacity of 19 Ah.

* * * * *